UNITED STATES PATENT OFFICE.

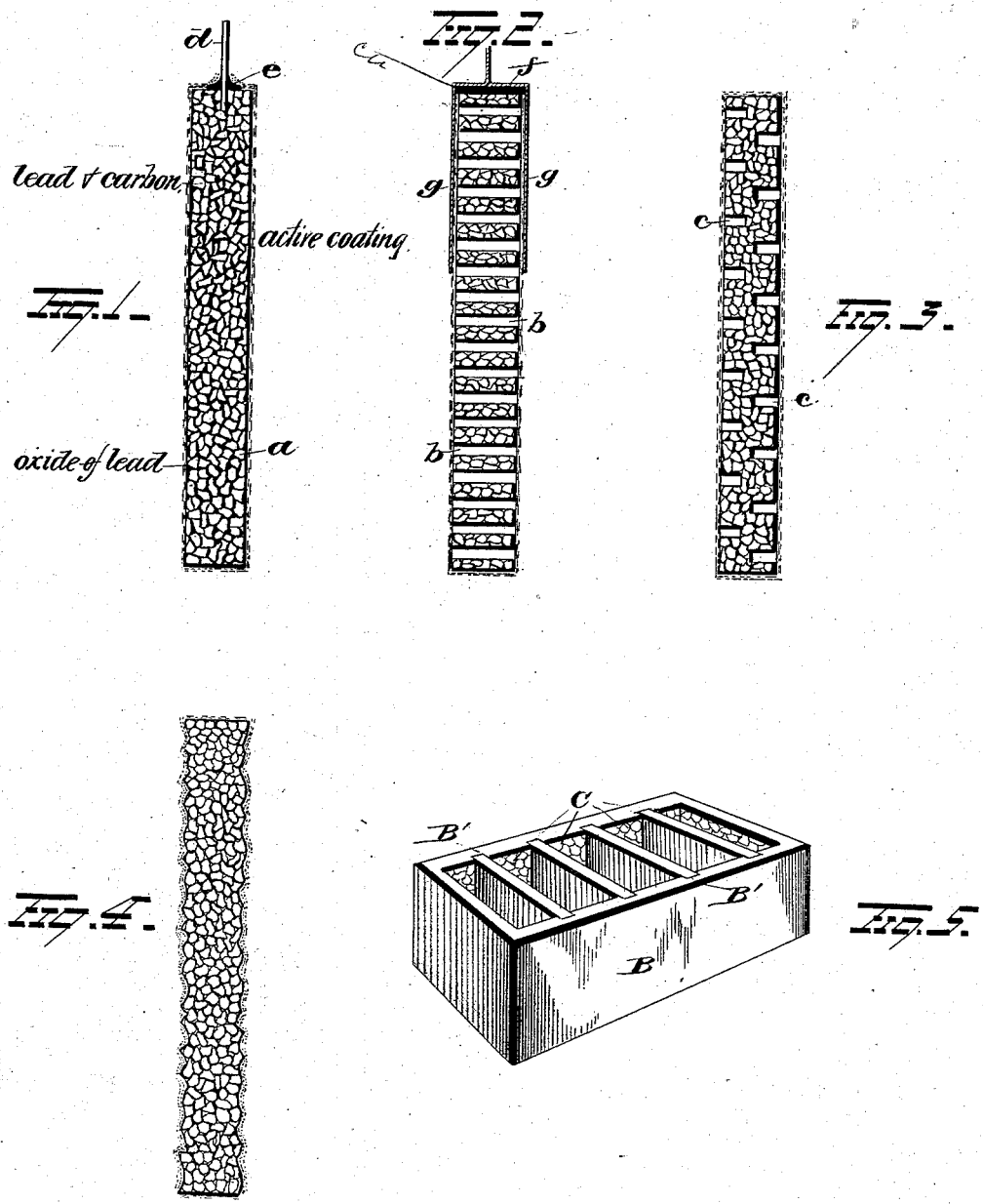

EUSEBIUS J. MOLERA AND JOHN C. CEBRIAN, OF SAN FRANCISCO, CALIFORNIA; SAID MOLERA ASSIGNOR TO SAID CEBRIAN.

SECONDARY BATTERY.

SPECIFICATION forming part of Letters Patent No. 291,526, dated January 8, 1884.

Application filed January 26, 1883. (No model.)

*To all whom it may concern:*

Be it known that we, EUSEBIUS J. MOLERA and JOHN C. CEBRIAN, of San Francisco, in the county of San Francisco and State of California, have invented certain new and useful Improvements in Secondary Batteries; and we do hereby declare the following to be a full, clear, and exact description of the invention, such as will enable others skilled in the art to which it pertains to make and use the same.

Our invention relates to an improvement in secondary batteries, the object being to produce elements or electrodes for secondary batteries, which will have a comparatively large active surface and a low resistance, and connected so as to be of minimum weight and maximum efficiency and durability.

With these objects in view our invention consists in a secondary-battery electrode consisting of a mixture of carbon and lead, or its equivalent, compressed or molded into any desired form.

Our invention further consists in a secondary battery embodying certain features of construction, as will be hereinafter described, and pointed out in the claims.

In the accompanying drawings, Figure 1 is an ideal representation, in vertical section, of a secondary element embodying our invention. Figs. 2, 3, and 4 illustrate modifications. Fig. 5 is a view of a battery-box.

In the manufacture of our improved electrodes, we take charcoal, coke, or other forms of carbon and pulverize it, (or lamp-black or carbon resulting from the distillation of hydrocarbons,) and mix therewith particles, $a$, of lead, which may be metallic lead or particles of lead oxidized by any suitable process, or a mixture of particles of metallic lead and of oxidized lead. While the relative proportions of carbon and lead may be varied without departing from our invention, we prefer to employ an excess of carbon. With the compound of carbon and lead particles we mix some viscous matters—such as molasses, sugar, or any saccharine matter—and thus produce a paste of the mixture, which is then molded into any desired form, then dried and thoroughly baked. The elements may be formed with perforations $b$, extending through the same, as illustrated in Fig. 2, or with recesses $c$, extending only partly through the elements, as shown in Fig. 3, or with ribs or roughened surfaces, as illustrated in Fig. 4. In order to establish good connection with the electrodes, we insert in the electrode, as it is being molded, a copper strip or wire, $d$, and make a galvanic deposition, $e$, of copper around the junction of the copper and carbon; or, instead of inserting a copper strip or wire, we may make an electro-deposition of copper, $f$, on any portion of the electrode, and solder thereto a metallic band or strip, $g$. As there are many different methods of forming the connection, we do not restrict ourselves to the particular methods shown and described. The electrodes, after having been constructed as described, are mechanically coated with oxide of lead—as, for instance, a layer of red lead is applied to the surfaces of the plate and subjected to pressure, thereby causing an intimate adhesion of lead to the carbon and lead plate or body, and this union or adhesion is rendered quite firm and intimate, owing to the fact that the particles comprising the lead oxide are forced into the pores of the carbon, and are thus retained against displacement. The plates are then immersed in dilute sulphuric acid, and by the passage of an electric current are subjected to the well-known "forming" process, which may be continued for any desired length of time. The plates may be formed prior to or after being associated together in the battery-cells. After they have been formed, they are connected up to form a battery, and by a passage of an electric current through the battery-fluid of dilute sulphuric acid, the plates are charged, which results in transforming the oxide of lead on the plates connected with one pole of the generator to peroxide of lead, and that on the surface of the plates connected with the other pole of the generator to spongy metallic lead.

Instead of producing the active surface in the manner described, it may be done by forming a coating of lead on the surface of the plate or body by electro-deposition in the usual manner, and then electrically forming the coating of peroxide of lead by the well-known Planté process. By the admixture of lead and carbon, substantially as described, we obtain an electrode having a large active surface, as we not only oxidize the outer surface of the electrode, but also the surfaces of the particles of lead within the electrode. Again, our electrodes are of very little weight, as compared with the ordinary forms of secondary-battery elements made of sheet or cast lead. Further, the electrodes are of low internal resistance, the conductivity of the carbon being very much the same as that of the lead, and as the carbon is in the form of an integral mass, holding therein particles of lead, but comparatively little resistance is offered to the passage of the charging-current.

The box B of the battery may, if desired, be provided with the slots B' for the insertion and retention of the electrodes. In order to insure lightness of material and of a completed battery, the box may be made of wood or paper, and boiled in paraffine to render it liquid-tight, and proof against deterioration by the action of the battery-fluid. The inside of the box may be first charred, as at C, and afterward boiled in paraffine.

A secondary battery constructed substantially in the manner before described is of great efficiency and economy in actual use, is durable and lasting, as the coating of oxide will not tend to peel off the surface of the plates, and will be of very light weight. Instead of mixing lead with carbon, as herein described, any metal or metallic compound equivalent to it in this capacity may be employed in its place.

We are aware that it has been proposed in a patent to make electrodes for secondary batteries by mixing red lead with plaster-of-paris or other like cement, or with china-clay or other similar earths and water, with or without the addition of other inert substances, presenting an extended surface—such as powdered glass, pumice, charcoal, asbestus, gypsum—and hence we would have it understood we make no claim to a secondary-battery electrode constructed in the manner above suggested.

We are also aware that it is old to heat wooden vessels and then coat them with paraffine, and hence we make no broad claim to such process.

We are also aware that secondary-battery electrodes have been made by taking oxide of lead, and mixing therewith vegetable or carbonaceous substances, adding water, oil, or sirup thereto to make a plastic mass, and then mold the mass into desired form, afterward heating the mass and reducing the oxide of lead to metallic lead within the pores of the carbon, and hence we would have it understood that we make no claim to such improvement.

Having fully described our invention, what we claim as new, and desire to secure by Letters Patent, is—

1. A secondary-battery element consisting of a mixture of carbon and lead compressed or molded into any desired form, and having a layer of active material applied to its surface, substantially as set forth.

2. A box or receptacle for a secondary battery, made of wood or paper charred on the inside and boiled in paraffine, substantially as set forth.

In testimony whereof we have signed this specification in the presence of two subscribing witnesses.

EUSEBIUS J. MOLERA.
JOHN C. CEBRIAN.

Witnesses to E. J. Molera's signature:
  F. O. McCLEARY,
  GEORGE COOK.

Witnesses to John C. Cebrian's signature:
  P. O. WEGENER,
  LOUIS PROLL, Jr.